US012650546B2

(12) United States Patent
Peng et al.

(10) Patent No.: US 12,650,546 B2
(45) Date of Patent: Jun. 9, 2026

(54) LENS ASSEMBLY INCLUDING WAVE PLATE

(71) Applicant: Apple Inc., Cupertino, CA (US)

(72) Inventors: Guolin Peng, Sunnyvale, CA (US);
Elson Y Liu, Santa Clara, CA (US);
Yuan Chen, Campbell, CA (US); **Khoa
Nguyen, San Jose, CA (US); Kaikai
Guo, Sunnyvale, CA (US); Zhibing Ge**,
Sunnyvale, CA (US); Seung Hoon Lee,
Santa Clara, CA (US); Se Hyun Ahn,
Santa Clara, CA (US)

(73) Assignee: Apple Inc., Cupertino, CA (US)

( * ) Notice: Subject to any disclaimer, the term of this
patent is extended or adjusted under 35
U.S.C. 154(b) by 432 days.

(21) Appl. No.: 18/328,290

(22) Filed: Jun. 2, 2023

(65) Prior Publication Data

US 2024/0045128 A1        Feb. 8, 2024

Related U.S. Application Data

(60) Provisional application No. 63/394,519, filed on Aug.
2, 2022.

(51) Int. Cl.
*G02B 5/30*        (2006.01)
*G02B 17/08*        (2006.01)
        (Continued)

(52) U.S. Cl.
CPC ........... *G02B 5/3083* (2013.01); *G02B 17/08*
(2013.01); *G02B 27/0172* (2013.01); *G02B
27/286* (2013.01); *G06F 1/163* (2013.01)

(58) Field of Classification Search
CPC ...... G02B 5/3083; G02B 5/30; G02B 5/3025;
G02B 5/3033; G02B 5/3041; G02B 5/305; G02B 17/08; G02B 27/0172;
G02B 27/286; G02B 27/017; G02B
27/0176; G02B 27/01; G02B 27/0101;
G02B 27/0149; G02B 27/28; G02B
27/283;
(Continued)

(56) References Cited

U.S. PATENT DOCUMENTS

| | | | |
|---|---|---|---|
| 7,859,977 B2 | 12/2010 | Tan et al. | |
| 8,947,760 B2 | 2/2015 | McCarthy | |

(Continued)

FOREIGN PATENT DOCUMENTS

WO        WO-2022119679 A1 *    6/2022    ......... G02B 27/0093

*Primary Examiner* — Stephone B Allen
*Assistant Examiner* — Adam W Booher
(74) *Attorney, Agent, or Firm* — Treyz Law Group, P.C.;
Joseph F. Guihan; Jinie M. Guihan

(57)        ABSTRACT

An electronic device may include a display panel configured
to produce light and a lens assembly that receives the light
from the display panel. The lens assembly may include a first
lens and a second lens. The second lens may be a removable
lens that is configured to be selectively attached to the lens
assembly. The lens assembly may also include a partially
reflective mirror that is interposed between the first lens and
the display panel, a reflective polarizer that is interposed
between the first lens and the second lens when the second
lens is attached to the lens assembly, and a quarter wave
plate that is interposed between the reflective polarizer and
the second lens when the second lens element is attached to
the lens assembly.

15 Claims, 8 Drawing Sheets

(51) Int. Cl.

| | | |
|---|---|---|
| *G02B 27/01* | (2006.01) | |
| *G02B 27/28* | (2006.01) | |
| *G06F 1/16* | (2006.01) | |

(58) Field of Classification Search
CPC ...... G02B 2027/0118; G02B 2027/012; G02B 2027/0154; G02B 2027/0156; G02B 2027/0161; G06F 1/163
See application file for complete search history.

(56) References Cited

U.S. PATENT DOCUMENTS

| | | | |
|---|---|---|---|
| 9,323,059 B2 | 4/2016 | Wang et al. | |
| 10,139,492 B2 | 11/2018 | Rezk et al. | |
| 10,139,627 B2 | 11/2018 | Benoit et al. | |
| 10,591,707 B2 | 3/2020 | Khan et al. | |
| 10,663,745 B2 | 5/2020 | Ouderkirk et al. | |
| 10,691,198 B1* | 6/2020 | Gollier ............... | G02B 27/0018 |
| 10,816,804 B2 | 10/2020 | Martinez et al. | |
| 11,366,260 B1* | 6/2022 | Ouderkirk .............. | G02B 5/208 |
| 11,372,239 B1 | 6/2022 | Sulai et al. | |
| 2016/0041396 A1 | 2/2016 | Kawamura et al. | |
| 2018/0039052 A1 | 2/2018 | Khan et al. | |
| 2018/0231786 A1 | 8/2018 | Ouderkirk et al. | |
| 2019/0086675 A1 | 3/2019 | Carollo et al. | |
| 2019/0369390 A1* | 12/2019 | Gollier ............... | G02B 27/0172 |
| 2020/0081253 A1 | 3/2020 | Montevirgen et al. | |
| 2020/0096817 A1* | 3/2020 | Richards ................ | G02B 27/32 |
| 2020/0341268 A1* | 10/2020 | Amirsolaimani .... | G02B 5/3083 |
| 2020/0356053 A1 | 11/2020 | Seo et al. | |

* cited by examiner

LENS ASSEMBLY INCLUDING WAVE PLATE

This application claims priority to U.S. provisional patent application No. 63/394,519, filed Aug. 2, 2022, which is hereby incorporated by reference herein in its entirety.

BACKGROUND

This relates generally to optical systems and, more particularly, to optical systems in electronic devices.

Electronic devices such as head-mounted devices use lenses to display images for a user. A microdisplay may create images for each of a user's eyes. A lens may be placed between each of the user's eyes and a portion of the microdisplay so that the user may view virtual reality content.

If care is not taken, a head-mounted device may be cumbersome and tiring to wear. Optical systems for head-mounted devices may use arrangements of lenses that are bulky and heavy. Extended use of a head-mounted device with this type of optical system may be uncomfortable.

It would therefore be desirable to be able to provide improved electronic devices.

SUMMARY

An electronic device may include a display system and a lens assembly. The display system and lens assembly may be supported by a housing that is worn on a user's head. The head-mounted device may use the display system and lens assembly to present images to the user while the housing is being worn on the user's head.

The display system may have a pixel array that produces image light associated with the images. The lens assembly may be a catadioptric lens assembly having at least first and second lens elements. The second lens element may be a removable lens element that is configured to be selectively attached to the optical system.

A reflective polarizer may be interposed between the first and second lens elements. A first quarter wave plate may be interposed between the first lens element and the reflective polarizer. A second quarter wave plate may be interposed between the second lens element and the reflective polarizer. The second quarter wave plate may block reflections within the lens assembly and improve contrast for the display system.

DETAILED DESCRIPTION

Figure 1:
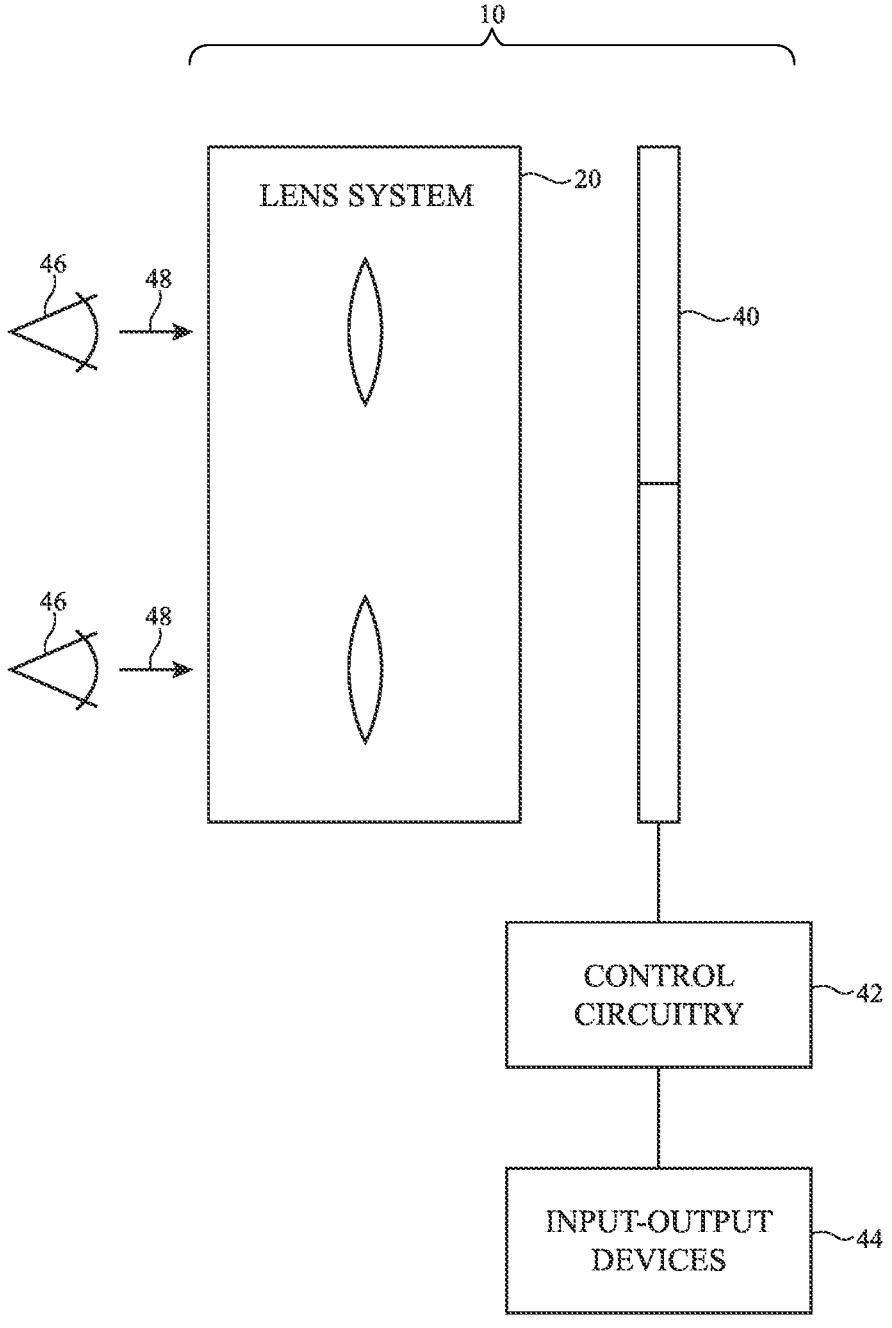
FIG. 1 is a diagram of an illustrative electronic device in accordance with some embodiments.

An illustrative electronic device of the type that may be provided with a display is shown in FIG. 1. As shown in FIG. 1, electronic device 10 (sometimes referred to as glasses 10, virtual reality glasses 10, augmented reality glasses 10, extended reality glasses 10, head-mounted device 10, head-mounted display 10, device 10, etc.) may include a display system such as display system 40 that creates images and may have an optical system such as optical system through which a user (see, e.g., user's eyes 46) may view the images produced by display system 40 by looking in direction 48.

Display system 40 (sometimes referred to as display panel 40 or display 40) may be based on a liquid crystal display, an organic light-emitting diode display, an emissive display having an array of crystalline semiconductor light-emitting diode dies, and/or displays based on other display technologies. Separate left and right displays may be included in system 40 for the user's left and right eyes or a single display may span both eyes.

Visual content (e.g., image data for still and/or moving images) may be provided to display system (display) 40 using control circuitry 42 that is mounted in electronic device 10 and/or control circuitry that is mounted outside of electronic device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such computer-generated content, pre-recorded video for a movie or other media, or other images. In general, any suitable content may be presented to a user by control circuitry 42 using display system 40 and optical system 20 of electronic device 10.

Input-output devices 44 may be coupled to control circuitry 42. Input-output devices 44 may be used to gather user input from a user, may be used to make measurements on the environment surrounding electronic device 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensor, accelerometers, gyroscopes, and/or other sensors for measuring orientation, position, and/or movement of electronic device 10, proximity sensors, capacitive touch sensors, strain gauges, gas sensors, pressure sensors, ambient light sensors, and/or other sensors). If desired, input-output devices 44 may include one or more cameras/optical sensors (e.g., cameras for capturing images of the user's surroundings, cameras for performing gaze detection operations by viewing eyes 46, and/or other cameras).

Figure 2:
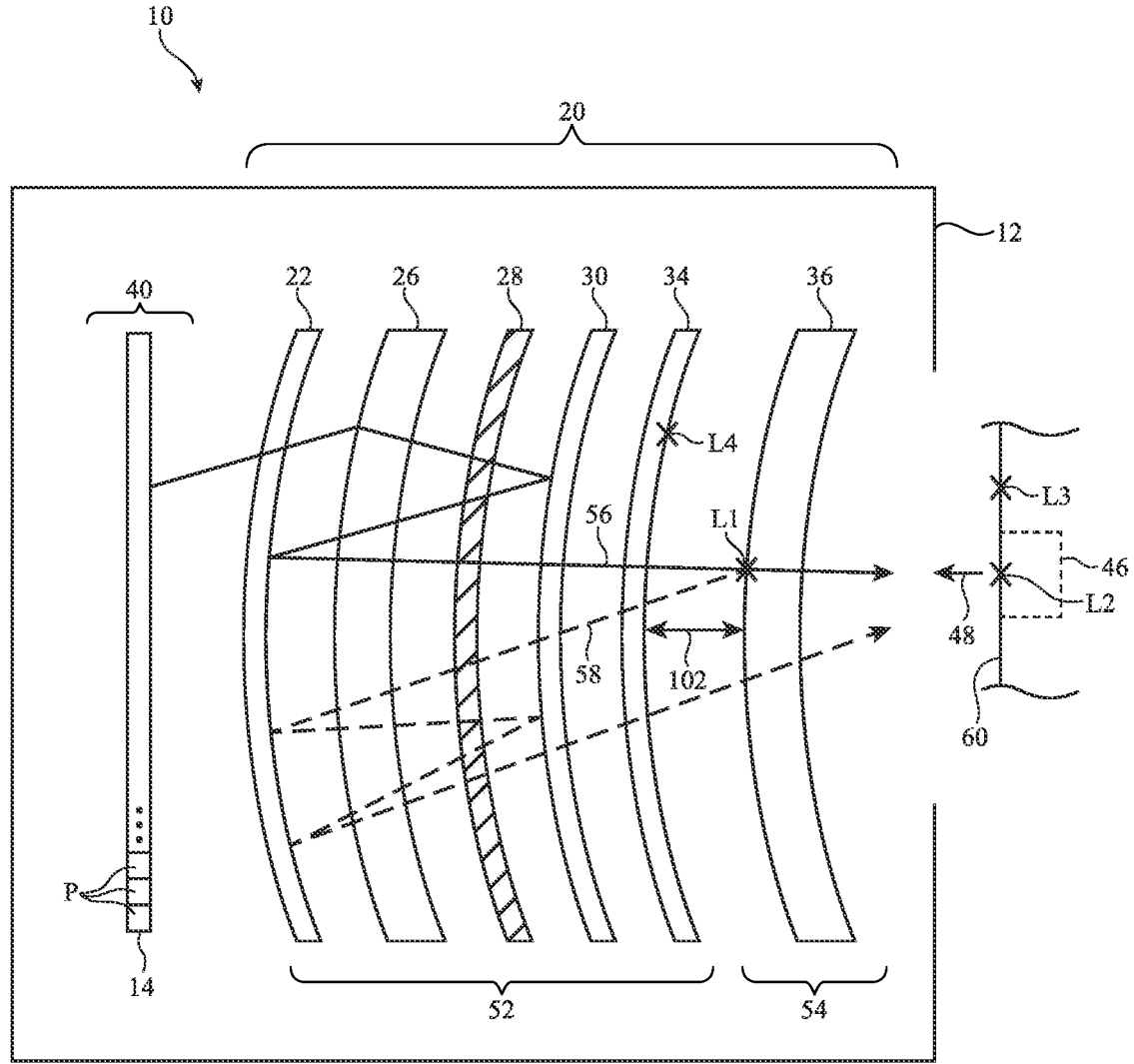
FIG. 2 is a side view of an illustrative electronic device with a removable lens element in accordance with some embodiments.

FIG. 2 is a side view of electronic device 10 showing how optical system 20 and display system 40 may be supported by head-mounted support structures such as housing 12 for electronic device 10. Housing 12 may have the shape of a frame for a pair of glasses (e.g., electronic device 10 may resemble eyeglasses), may have the shape of a helmet (e.g., electronic device 10 may form a helmet-mounted display), may have the shape of a pair of goggles, or may have any other suitable housing shape that allows housing 12 to be worn on the head of a user. Configurations in which housing 12 supports optical system 20 and display system 40 in front of a user's eyes (e.g., eyes 46) as the user is viewing system 20 and display system 40 in direction 48 may sometimes be described herein as an example. If desired, housing 12 may have other desired configurations.

Housing 12 may be formed from plastic, metal, fiber-composite materials such as carbon-fiber materials, wood and other natural materials, glass, other materials, and/or combinations of two or more of these materials.

Input-output devices 44 and control circuitry 42 may be mounted in housing 12 with optical system 20 and display system 40 and/or portions of input-output devices 44 and control circuitry 42 may be coupled to electronic device 10 using a cable, wireless connection, or other signal paths.

Display system 40 and the optical components of electronic device 10 may be configured to display images for user 46 using a lightweight and compact arrangement. Optical system 20 (sometimes referred to as a lens assembly, lens module, optical assembly, optical module, etc.) may, for example, be based on catadioptric lenses (e.g., lenses that use both reflecting and refracting of light).

Display system 40 may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). Display system 40 may also include additional optical components such as a linear polarizer, a wave plate such as a quarter wave plate, etc.

Optical system 20 may include a lens element such as lens element 26 (sometimes referred to as lens 26). Lens element 26 may be formed from a transparent material such as plastic or glass. Lens element 26 may have a surface that faces display system 40 (sometimes referred to as a display-facing surface) and a surface that faces the user (sometimes referred to as an eye-facing surface or viewer-facing surface). Each surface of lens element 26 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface. A freeform surface may include both convex and concave portions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface.

A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. In one illustrative arrangement, shown in FIG. 2, the surface of lens element 26 facing display system 40 is a convex surface and the surface of lens element 26 facing eye 46 is a concave surface.

Optical structures such as partially reflective coatings, wave plates, reflective polarizers, linear polarizers, antireflection coatings, and/or other optical components may be incorporated into electronic device 10 (e.g., lens assembly 20, etc.). These optical structures may allow light rays from display system 40 to pass through and/or reflect from surfaces in optical system 20, thereby providing optical system 20 with a desired lens power.

An illustrative arrangement for the optical layers is shown in FIG. 2. As shown in FIG. 2, a partially reflective mirror (e.g., a metal mirror coating or other mirror coating such as a dielectric multilayer coating with a 50% transmission and a 50% reflection) such as partially reflective mirror 22 may be formed on the convex surface of lens element 26. Partially reflective mirror 22 may sometimes be referred to as beam splitter 22, half mirror 22, partially reflective layer 22, etc.

A wave plate such as wave plate 28 may be formed on the concave surface of lens element 26. Wave plate 28 may be attached to lens element 26 (e.g., using an optically clear adhesive layer or via coating directly to the lens element without an intervening adhesive layer). Wave plate 28 (sometimes referred to as retarder 28, quarter wave plate 28, etc.) may be a quarter wave plate that conforms to the concave surface of lens element 26. Retarder 28 may be a coating on the concave surface S2 of lens element 26.

Reflective polarizer 30 may be attached to retarder 28 (e.g., using an optically clear adhesive layer or via coating directly to the retarder without an intervening adhesive layer). Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30.

Polarizer 34 may be attached to reflective polarizer 30 (e.g., using an optically clear adhesive layer or via coating directly to the reflective polarizer without an intervening adhesive layer). Polarizer 34 may be a linear polarizer.

Polarizer 34 may sometimes be referred to as an external blocking linear polarizer 34 or cleanup polarizer 34. Linear polarizer 34 may have a pass axis aligned with the pass axis of reflective polarizer 30.

Lens assembly 20 may include an additional lens element such as lens element 36 (sometimes referred to as lens 36). Lens element 36 may be formed from a transparent material such as plastic or glass. In FIG. 2, lens element 36 has a convex surface that faces display system 40 and a concave surface that faces the user (e.g., eyes 46). This example is merely illustrative. In general, each surface of lens element 36 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface.

In one possible arrangement, lens element 36 may be a removable lens element. In other words, a user may be able to easily remove and replace lens element 36 within lens assembly 20. This may allow lens element 36 to be customizable. If lens element 36 is permanently affixed to the lens assembly, the lens power provided by lens element 36 cannot be easily changed. However, by making lens element 36 customizable, a user may select a lens element 36 that best suits their eyes and place the appropriate lens element 36 in the lens assembly. The lens element 36 may be used to accommodate a user's eyeglass prescription, for example. A user may replace lens element 36 with an updated lens element if their eyeglass prescription changes (without needing to replace any of the other components within electronic device 10). Lens element 36 may have varying lens power and/or may provide varying amount of astigmatism correction to provide prescription correction for the user. Lens element 36 may include one or more attachment structures that are configured to attach to corresponding attachment structures included in lens element 26, support structure 10, or another structure in electronic device 10.

In contrast with lens element 36, lens element 26 may not be a removable lens element. Lens element 26 may therefore sometimes be referred to as a permanent lens element, fixed lens element, non-removable lens element, etc. The example of lens element 26 being a non-removable lens element is merely illustrative. In another possible arrangement, lens element 26 may also be a removable lens element (similar to lens element 36).

A first subset 52 of lens assembly 20 may be referred to as a permanent portion 52 of lens assembly 20. Permanent portion 52 may sometimes be referred to as fixed portion 52, non-removable portion 52, permanent lens assembly portion 52, fixed lens assembly portion 52, non-removable lens assembly portion 52, etc. A second subset 54 of lens assembly 20 may be referred to as a removable portion 54 of lens assembly 20. Removable portion 54 may sometimes be referred to as customizable portion 54, removable lens assembly portion 54, customizable lens assembly portion 54, etc. In the example of FIG. 2, partially reflective layer 22, lens element 26, wave plate 28, reflective polarizer 30, and linear polarizer 34 are included in non-removable lens assembly portion 52 and lens element 36 is included in removable lens assembly portion 54. An air gap 102 may be present between non-removable lens assembly portion 52 and removable lens assembly portion 54.

If care is not taken, reflections within lens assembly 20 may undesirably reduce the contrast ratio of images displayed by display system 40 and/or create ghost images perceived by the viewer. Light emitted by pixel array 14 may desirably follow path 56, where the light passes towards eye

46 through partially reflective layer 22, lens element 26, and wave plate 28 before being reflected by reflective polarizer 30. After being reflected by reflective polarizer 30, the light passes away from eye 46 through wave plate 28 and lens element 26 before being reflected by partially reflective layer 22. After being reflected by partially reflective layer 22, the light passes towards eye 46 through lens element 26, wave plate 28, reflective polarizer 30, linear polarizer 34, and lens element 36. The light on path 56 may be refracted one or more times while passing through the lens assembly.

In practice, there may be undesirable reflections at one or more surfaces within lens assembly 20. FIG. 2 shows how there may be undesired reflections at a first location L1 (e.g., a surface of lens element 36). These reflections may follow path 58 through the lens assembly and ultimately may be perceived by the eye 46. The reflections perceived by eye 46 may cause ghost images and reduce contrast in the display system. Undesired reflections may be caused by reflections off the eye 46 at location L2 (e.g., off the cornea of the eye and/or a contact lens that covers the eye), off the viewer's skin 60 near the eye at location L3, off an eye-facing surface of polarizer 34 at location L4, etc. In general, the surface of any component within lens assembly has the potential to cause undesired reflections.

Figure 3:
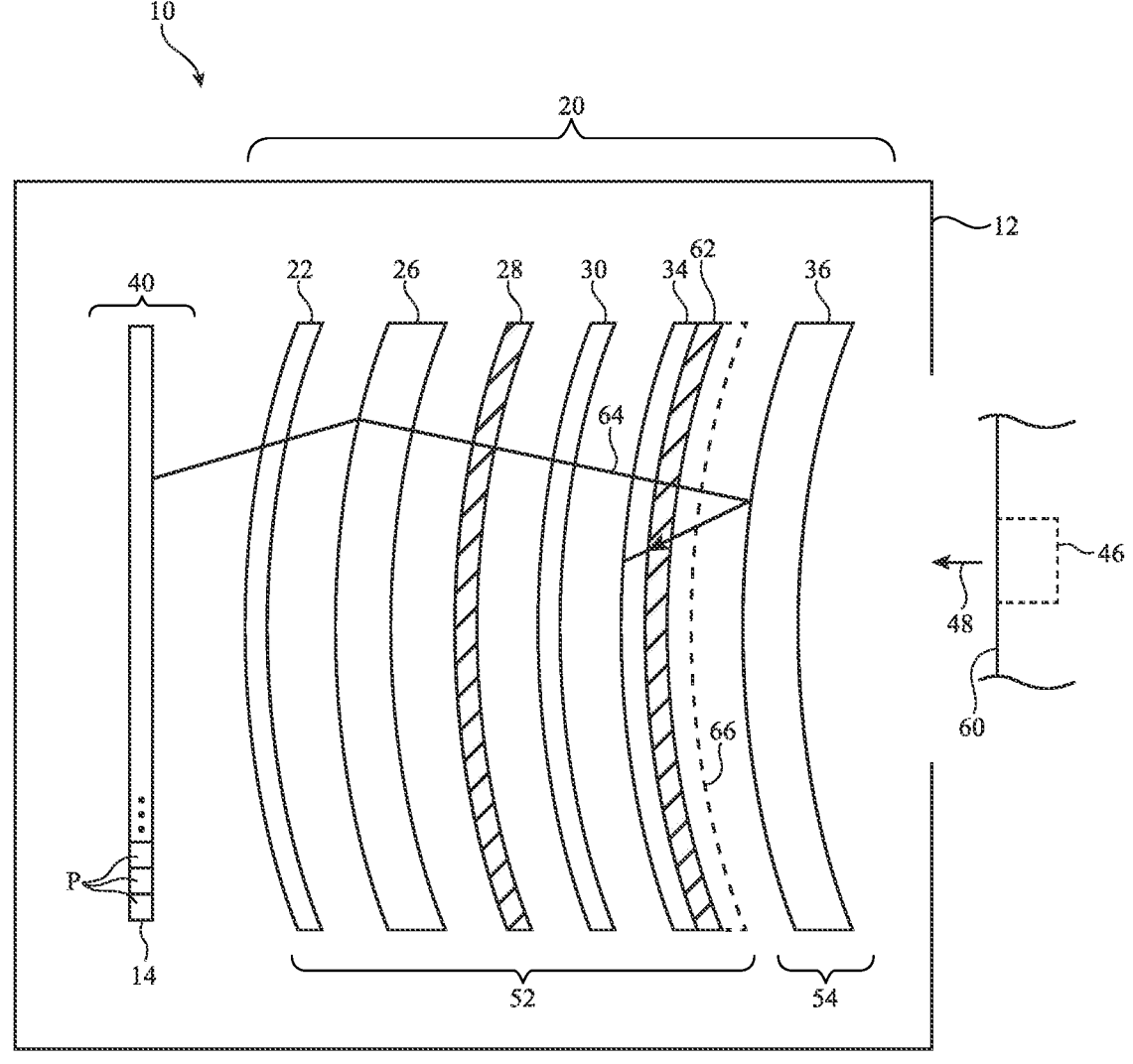
FIG. 3 is a side view of an illustrative electronic device with a non-removable lens assembly portion that includes a supplemental wave plate in a in accordance with some embodiments.

To mitigate undesired reflections and improve contrast ratio in lens assembly 20 and display system 40, a supplemental wave plate may be included in the lens assembly. FIG. 3 is a side view of an electronic device 10 with a lens assembly 20 that includes a supplemental wave plate 62. The supplemental wave plate may be a quarter wave plate. Supplemental wave plate 62 may sometimes be referred to as supplemental retarder 62, supplemental quarter wave plate 62, wave plate 62, retarder 62, quarter wave plate 62, etc.

As shown in FIG. 3, wave plate 62 may be interposed between linear polarizer 34 and lens element 36 during operation of electronic device 10. Consider the example of light that follows path 64 in FIG. 3. The light is undesirably reflected off lens element 36 (similar to as in FIG. 2). The light following path 64 passes through linear polarizer 34 towards eye 46 with a first polarization (aligned with the pass axis of linear polarizer 34 and reflective polarizer 30). The light passes through quarter wave plate 62 a first time (when traveling towards the eye) and then a second time (when traveling away from the eye after being reflected by lens element 36). This causes the reflected light incident on linear polarizer 34 to have a second polarization (orthogonal to the pass-axis of linear polarizer 34). The linear polarizer therefore blocks (absorbs) the reflected light off lens element 36. Wave plate 62 may similarly mitigate reflected light off eye 46, skin 60, and/or other components in lens assembly 20 from being perceived by eye 46.

An anti-reflection layer 66 may optionally be formed on quarter wave plate 62 such that the quarter wave plate is interposed between the linear polarizer 34 and anti-reflection layer 66. The anti-reflection layer 66 (sometimes referred to as anti-reflective coating) may be coated directly on quarter wave plate 62 or attached to quarter wave plate 62 with adhesive. The anti-reflection layer may mitigate reflections off the surface of quarter wave plate 62 that faces eye 46. The presence of anti-reflection layer 66 is optional and the anti-reflection layer 66 may therefore be omitted from lens assembly 20 if desired.

In FIG. 3, quarter wave plate 62 is formed in non-removable lens assembly portion 52. Specifically, the quarter wave plate 62 is formed on (e.g., attached via optically clear adhesive to or coated on) the eye-facing surface of linear polarizer 34. This example is merely illustrative. In another possible arrangement, shown in FIG. 4, quarter wave plate 62 is formed in removable lens assembly portion 54. Specifically, the quarter wave plate 62 may be formed on (e.g., attached via optically clear adhesive to or coated on) the display-facing surface (e.g., the convex surface in FIG. 4) of lens element 36.

Figure 4:
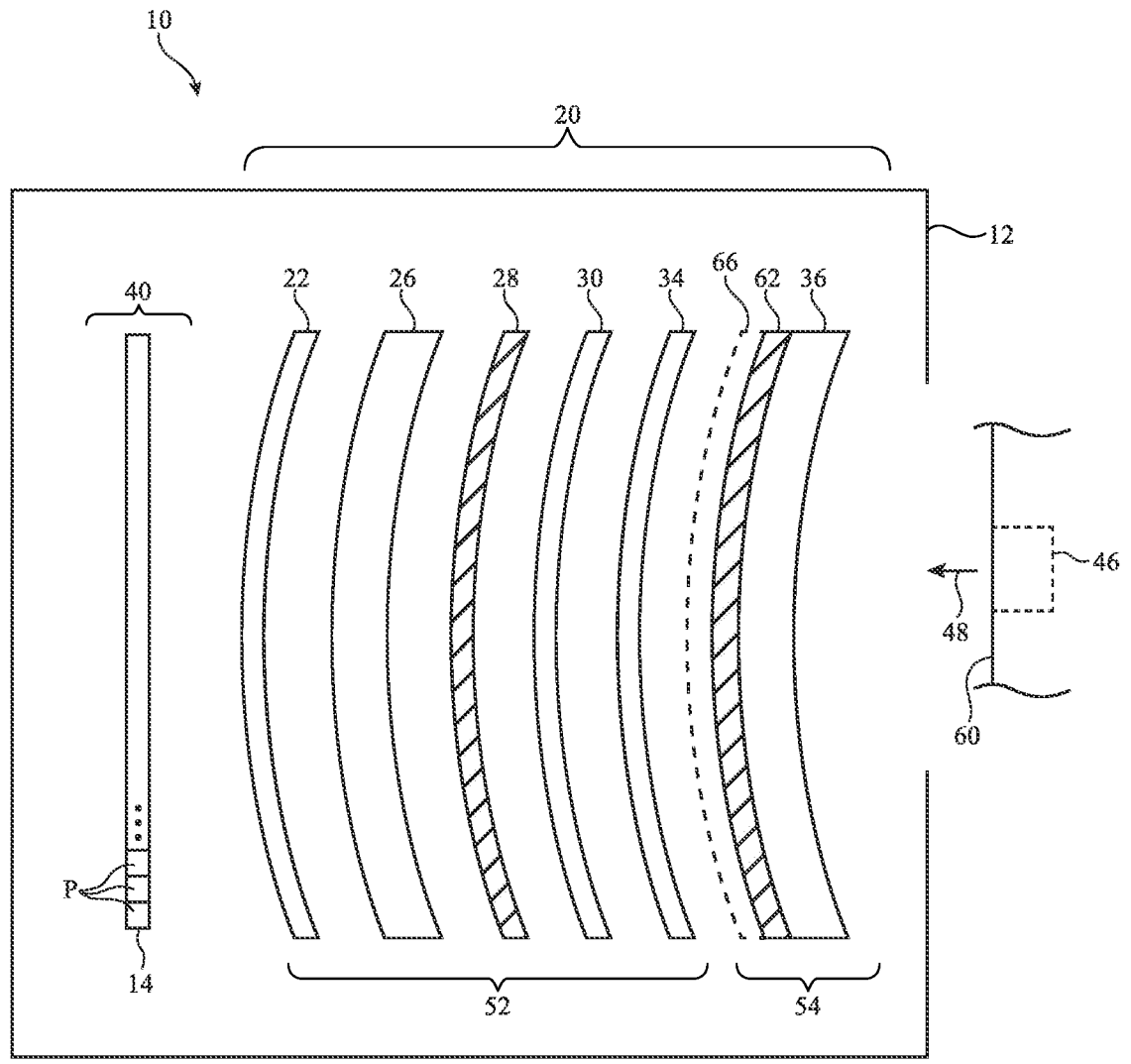
FIG. 4 is a side view of an illustrative electronic device with a removable lens assembly portion that includes a removable lens element and a supplemental wave plate in accordance with some embodiments.

In FIG. 4, an anti-reflection layer 66 may optionally be formed on quarter wave plate 62 such that the quarter wave plate is interposed between the lens element 36 and anti-reflection layer 66. The anti-reflection layer 66 (sometimes referred to as anti-reflective coating) may be coated directly on quarter wave plate 62 or attached to quarter wave plate 62 with adhesive. The presence of anti-reflection layer 66 is optional and the anti-reflection layer 66 may therefore be omitted from lens assembly 20 in FIG. 4 if desired.

In FIG. 4, linear polarizer 34 is formed in non-removable lens assembly portion 52. This example is merely illustrative. In another possible arrangement, shown in FIG. 5, linear polarizer 34 is formed in removable lens assembly portion 54. Specifically, the linear polarizer 34 may be formed on (e.g., attached via optically clear adhesive to or coated on) the quarter wave plate 62.

Figure 6:
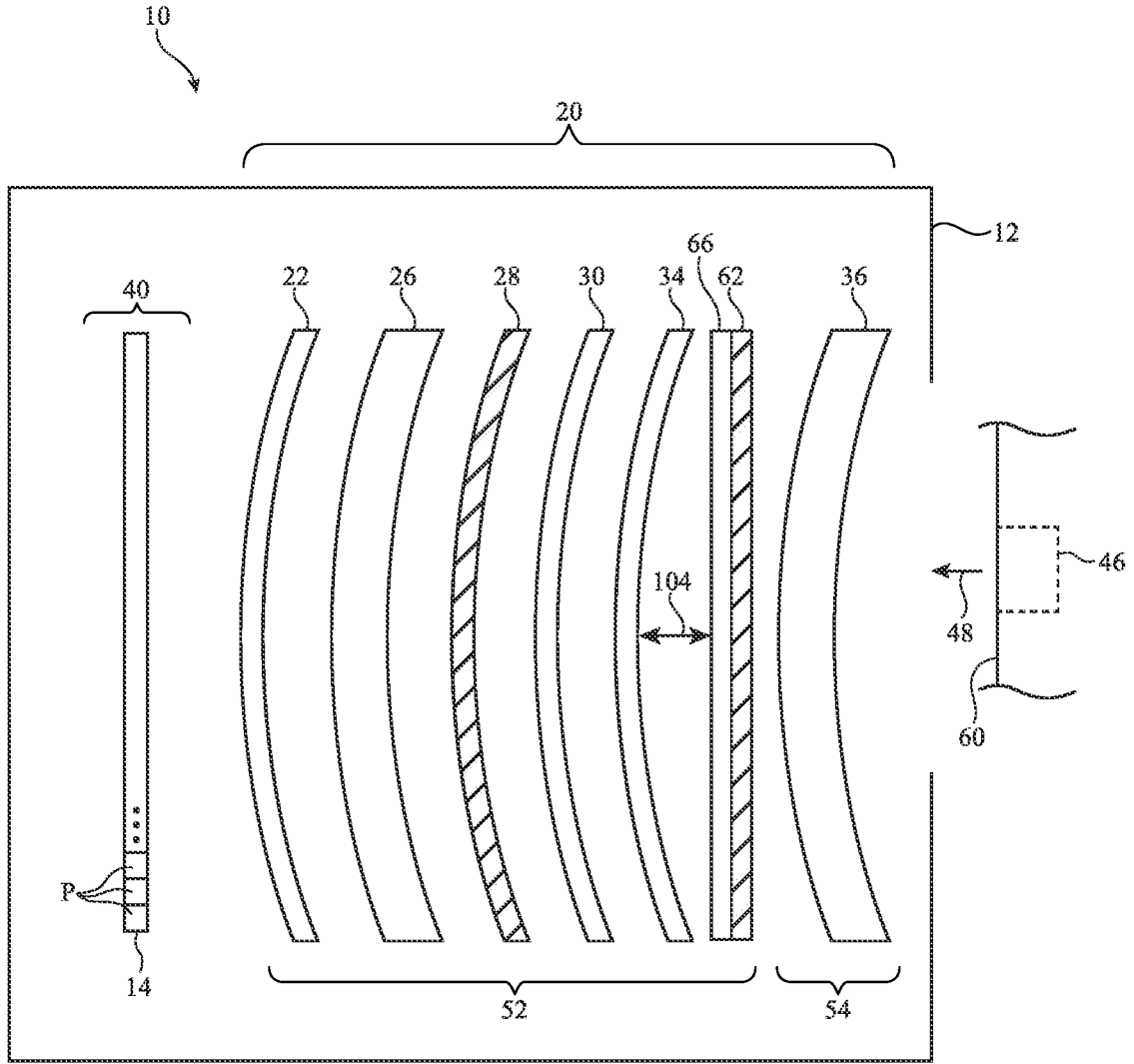
FIG. 6 is a side view of an illustrative electronic device with a non-removable lens assembly portion that includes a supplemental wave plate separated from a linear polarizer by an air gap in accordance with some embodiments.

In FIG. 3, quarter wave plate 62 conforms to the curvature of linear polarizer 34. This example is merely illustrative. In another possible arrangement, shown in FIG. 6, quarter wave plate 62 is separated from linear polarizer 34 by an air gap 104. Quarter wave plate 62 may therefore have differing curvature than linear polarizer 34. The quarter wave plate may be planar, as an example (as shown in FIG. 6). When air gap 104 is included between quarter wave plate 62 and linear polarizer 34, an anti-reflection layer 66 may be included on quarter wave plate 62 such that the quarter wave plate is interposed between the lens element 36 and anti-reflection layer 66. The anti-reflection layer 66 (sometimes referred to as anti-reflective coating) may be coated directly on quarter wave plate 62 or attached to quarter wave plate 62 with adhesive.

Figure 7:
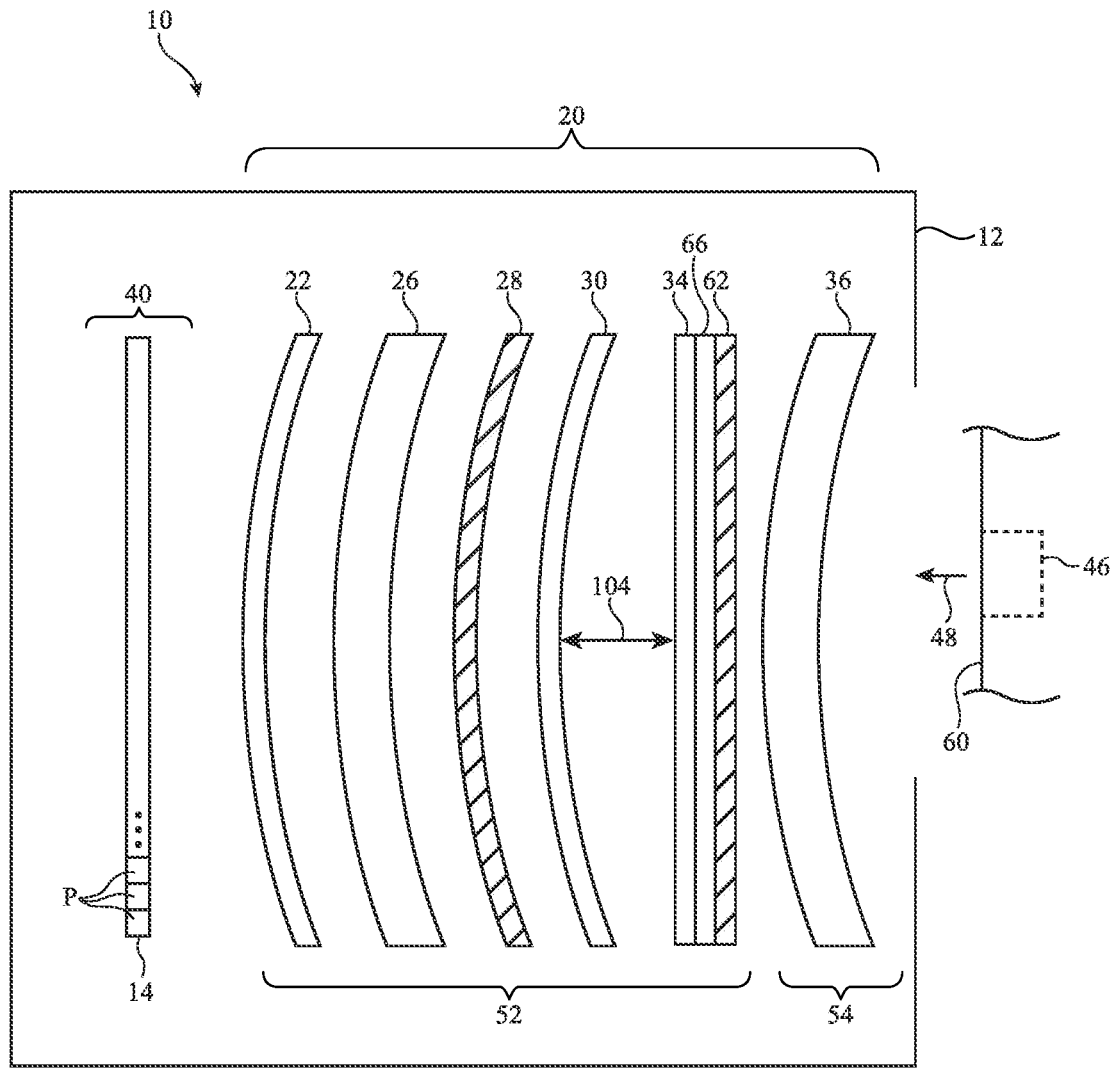
FIG. 7 is a side view of an illustrative electronic device with a non-removable lens assembly portion that includes a supplemental wave plate and linear polarizer separated from a reflective polarizer by an air gap in accordance with some embodiments.

In FIGS. 3 and 6, linear polarizer 34 conforms to the curvature of reflective polarizer 30. This example is merely illustrative. In yet another possible arrangement, shown in FIG. 7, linear polarizer 34 is separated from reflective polarizer 30 by an air gap 104.

The linear polarizer may be coated directly on anti-reflection layer 66 (or wave plate 62) or attached to anti-reflection layer 66 (or wave plate 62) with adhesive.

FIGS. 2-7 show arrangements where one lens element is included in the non-removable lens assembly portion 52. This example is merely illustrative. In another possible arrangement, shown in FIG. 8, a first lens element 26-1 is included between partially reflective layer 22 and quarter wave plate 28. A second lens element 26-2 is also included between quarter wave plate 62 and removable lens assembly portion 54.

Figure 8:
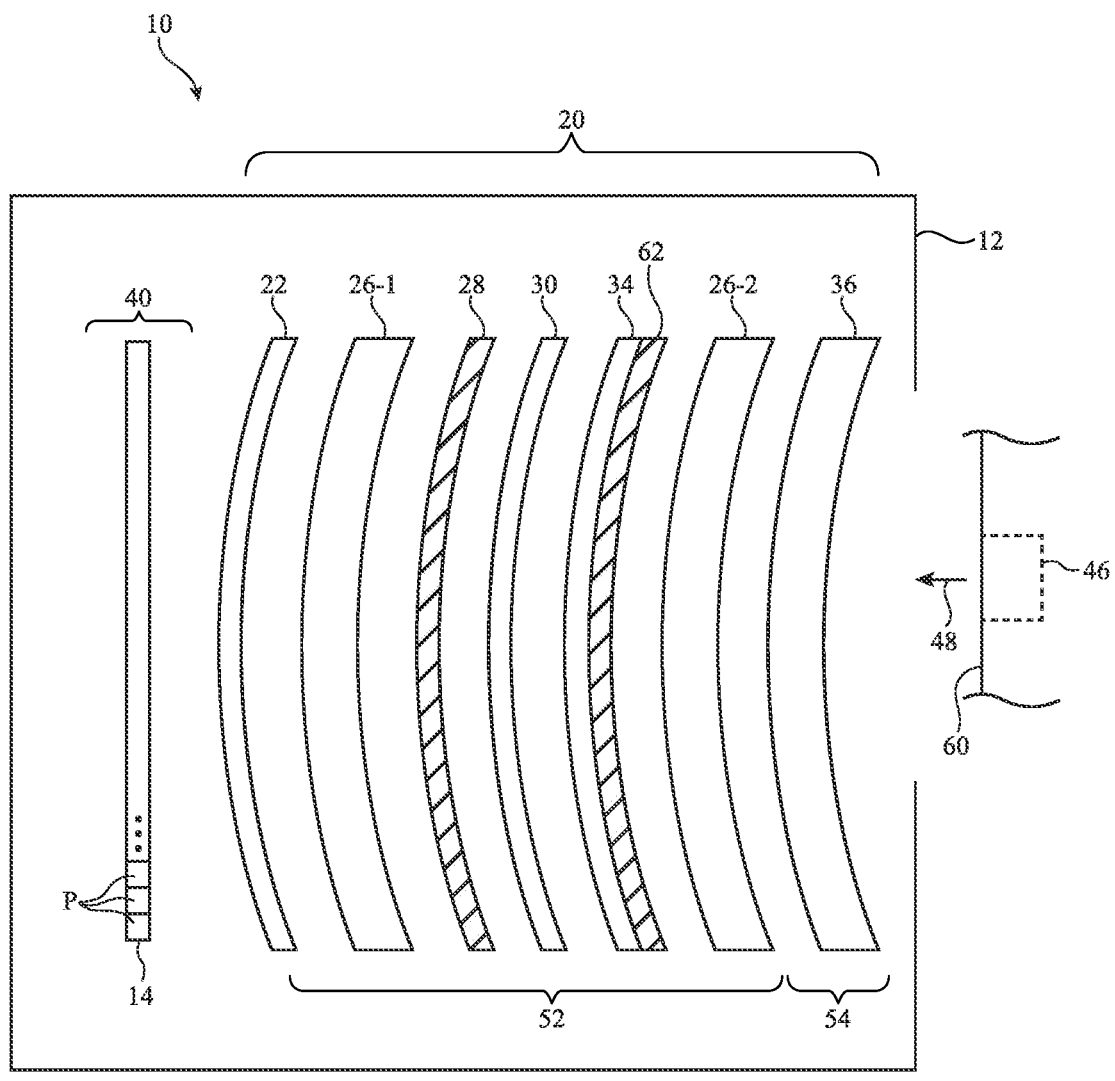
FIG. 8 is a side view of an illustrative electronic device with a non-removable lens assembly portion that includes a supplemental wave plate and two lens elements in accordance with some embodiments.

Lens element 26-2 may be formed from a transparent material such as plastic or glass. In FIG. 8, lens element 26-2 has a convex surface that faces display system 40 and a concave surface that faces the user (e.g., eyes 46). This example is merely illustrative. In general, each surface of lens element 26-2 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface. The lens element 26-2 may be in direct contact with quarter wave plate 62 or may be attached to quarter wave plate 62 using optically clear adhesive. Alternatively, an air gap may be included between quarter wave plate 62 and lens element 26-2.

The example in FIG. 8 of non-removable lens assembly portion 52 including two lens elements is merely illustrative. The non-removable lens assembly portion 52 may include any desired number of lens elements (e.g., one, two, three, four, more than four, etc.).

In FIGS. 2-8, for simplicity of the drawings, gaps are sometimes depicted between adjacent components of lens assembly 20. It should be noted that each pair of adjacent components in the lens assemblies of FIGS. 2-8 may instead be laminated together without an air gap. For example, partially reflective layer 22 and lens element 26 may be attached without an air gap (with an optional intervening layer of optically clear adhesive), lens element 26 and quarter wave plate 28 may be attached without an air gap (with an optional intervening layer of optically clear adhesive), quarter wave plate 28 and reflective polarizer 30 may be attached without an air gap (with an optional intervening layer of optically clear adhesive), reflective polarizer 30 and linear polarizer 34 may be attached without an air gap (with an optional intervening layer of optically clear adhesive), etc.

One or more components in lens assembly 20 (e.g., partially reflective layer 22, lens element 26, quarter wave plate 28, reflective polarizer 30, linear polarizer 34, and/or quarter wave plate 62) may have conformal curvature.

Linear polarizer 34 may be omitted from any of the lens assemblies described in FIGS. 2-8 if desired. When the linear polarizer is omitted, quarter wave plate 62 may be formed on (e.g., attached via optically clear adhesive to or coated on) the reflective polarizer, may be separated from the reflective polarizer by an air gap without an intervening linear polarizer, etc.

Figure 5:
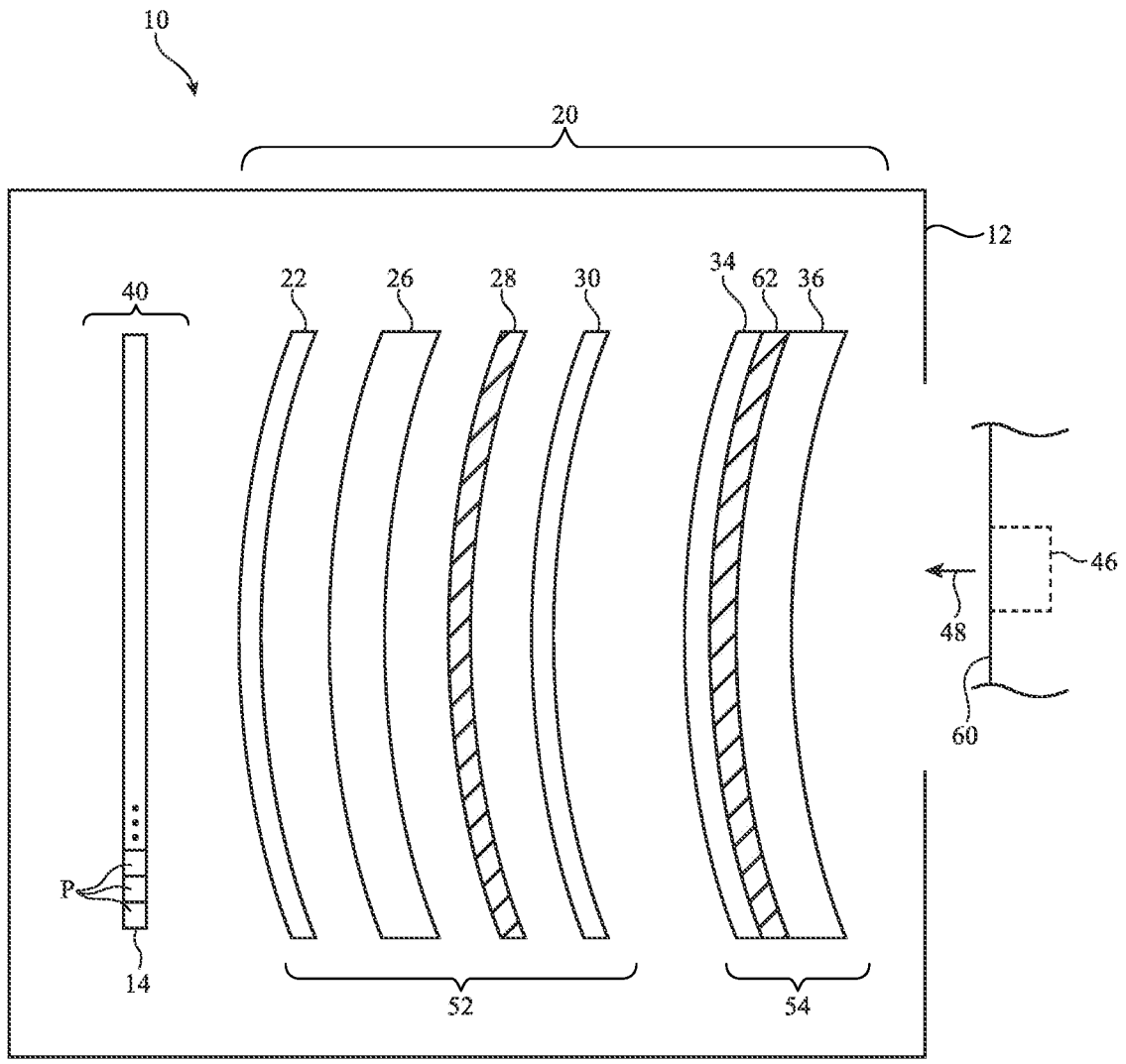
FIG. 5 is a side view of an illustrative electronic device with a removable lens assembly portion that includes removable lens element, a supplemental wave plate, and a linear polarizer in accordance with some embodiments.

In FIG. 5, an example is shown where linear polarizer 34 is included in removable lens assembly portion 54 but not in non-removable lens assembly portion 52. This example is merely illustrative. Linear polarizers may be included in both removable lens assembly portion 54 and non-removable lens assembly portion 52 if desired.

An air gap may be included between removable lens assembly portion 54 and non-removable lens assembly portion 52 in any of the arrangements of FIGS. 2-8.

It is further noted that removable lens 36 may be omitted from any of the lens assemblies described in FIGS. 2-8. Even without the removable lens 36 attached to the lens assembly, the supplemental quarter wave plate 62 improves contrast by mitigating reflections from L2, L3, and L4 in FIG. 2.

A lens assembly of the type shown in FIGS. 2-8 may be included for each eye of the viewer (e.g., a first lens assembly for the left eye and a second lens assembly for the right eye).

The foregoing is merely illustrative and various modifications can be made to the described embodiments. The foregoing embodiments may be implemented individually or in any combination.

What is claimed is:

1. An electronic device, comprising:
    a display panel configured to produce light; and
    a lens assembly that receives the light from the display panel, wherein the lens assembly comprises:
        a first curved lens;
        a second curved lens, wherein the second curved lens is a removable lens that is configured to be selectively attached to the lens assembly;

a partially reflective mirror that is interposed between the first curved lens and the display panel;

a curved reflective polarizer that is interposed between the first curved lens and the second curved lens when the second curved lens is attached to the lens assembly;

a planar quarter wave plate that is interposed between the curved reflective polarizer and the second curved lens when the second curved lens is attached to the lens assembly; and a curved linear polarizer that is interposed between the curved reflective polarizer and the planar quarter wave plate, wherein an air gap is interposed between the curved linear polarizer and the curved reflective polarizer.

2. The electronic device defined in claim 1, wherein the planar quarter wave plate is a first quarter wave plate and wherein the lens assembly further comprises:

a second quarter wave plate that is interposed between the first curved lens and the curved reflective polarizer, wherein the second quarter wave plate is a curved quarter wave plate.

3. The electronic device defined in claim 1, wherein the lens assembly comprises a fixed lens assembly portion that comprises the first curved lens, the partially reflective mirror, the curved reflective polarizer, the planar quarter wave plate, and the curved linear polarizer.

4. The electronic device defined in claim 1, wherein the lens assembly comprises a fixed lens assembly portion that comprises the first curved lens, the partially reflective mirror, the curved reflective polarizer, and the planar quarter wave plate.

5. The electronic device defined in claim 4, wherein the fixed lens assembly portion has first and second opposing surfaces, wherein the first surface is a curved surface, and wherein the second surface is a planar surface.

6. The electronic device defined in claim 1, wherein the lens assembly further comprises:

an anti-reflection layer on the planar quarter wave plate.

7. The electronic device defined in claim 6, wherein the anti-reflection layer is interposed between the curved reflective polarizer and the planar quarter wave plate.

8. The electronic device defined in claim 6, wherein the anti-reflection layer is interposed between the planar quarter wave plate and the second curved lens when the second curved lens is attached to the lens assembly.

9. The electronic device defined in claim 1, wherein the lens assembly comprises a removable lens assembly portion that includes the second curved lens.

10. The electronic device defined in claim 1, wherein the lens assembly further comprises:

a third lens that is interposed between the planar quarter wave plate and the second curved lens when the second curved lens is attached to the lens assembly.

11. An electronic device, comprising:

a display panel configured to produce light; and a lens assembly that receives the light from the display panel, wherein the lens assembly comprises a fixed lens assembly portion and a removable lens assembly portion, wherein the fixed lens assembly portion comprises a first lens, a partially reflective mirror that is interposed between the first lens and the display panel, and a reflective polarizer, wherein the first lens is interposed between the partially reflective mirror and the reflective polarizer, wherein the removable lens assembly portion comprises a quarter wave plate and a second lens, and wherein the quarter wave plate is interposed between the reflective polarizer and the second lens when the removable lens assembly portion is attached to the fixed lens assembly portion.

12. The electronic device defined in claim 11, wherein the quarter wave plate is a first quarter wave plate and wherein the fixed lens assembly portion further comprises a second quarter wave plate that is interposed between the first lens and the reflective polarizer.

13. The electronic device defined in claim 11, wherein the removable lens assembly portion further comprises:

a linear polarizer, wherein the quarter wave plate is interposed between the linear polarizer and the second lens.

14. An electronic device, comprising:

a display panel;

a first lens element;

a partially reflective mirror that is interposed between the first lens element and the display panel;

a first quarter wave plate;

a reflective polarizer, wherein the first quarter wave plate is interposed between the first lens element and the reflective polarizer;

a second quarter wave plate, wherein the reflective polarizer is interposed between the first quarter wave plate and the second quarter wave plate;

a second lens element, wherein the second quarter wave plate is interposed between the reflective polarizer and the second lens element and wherein the first and second lens elements are non-removable lens elements; and a third lens element adjacent to the second lens element, wherein the third lens element is a removable lens element.

15. The electronic device defined in claim 14, further comprising:

a linear polarizer that is interposed between the reflective polarizer and the second quarter wave plate.

* * * * *